United States Patent [19]
Wirt

[11] Patent Number: 5,187,544
[45] Date of Patent: Feb. 16, 1993

[54] TUNER FOR RING LASER GYRO DITHER MECHANISM

[75] Inventor: Thomas M. Wirt, Irvine, Calif.

[73] Assignee: Rockwell International Corporation, Seal Beach, Calif.

[21] Appl. No.: 763,775

[22] Filed: Sep. 23, 1991

[51] Int. Cl.⁵ .................................. G01C 19/68
[52] U.S. Cl. ........................................ 356/350
[58] Field of Search ...................... 356/350; 372/94

[56] References Cited

U.S. PATENT DOCUMENTS

| | | | |
|---|---|---|---|
| 4,085,825 | 4/1978 | Scarborough | 356/350 |
| 4,702,602 | 10/1987 | Grant | 356/350 |
| 4,733,966 | 3/1988 | Botler | 356/350 |
| 5,088,825 | 2/1992 | Derry et al. | 356/350 |

Primary Examiner—Samuel A. Turner
Attorney, Agent, or Firm—H. Fredrick Hamann; George A. Montanye; Tom Streeter

[57] ABSTRACT

The tuner for ring laser gyro dither mechanism shown herein is a disk 32 which is bolted to the top end 48 of a base mounted vane 24 of the gyro. All such base mounted vane top ends 48 are thus bolted together, thereby stiffening the spring constant of the azimuthal vibration 52 of the top ends 48, thus increasing the frequency of the dither mechanism.

8 Claims, 6 Drawing Sheets

TUNER FOR RING LASER GYRO DITHER MECHANISM

BACKGROUND OF THE INVENTION

The present invention relates to dither mechanisms for ring laser gyros, and has particular relation to apparatus for tuning the frequency of such dither mechanisms.

A ring laser gyro must be mounted on a central axial flexure, or dither mechanism, so that it may be axially rotated to avoid lock-in. The frequency of axial dither is heavily dependent upon the particular flexure and the rotational inertia of the ring laser gyro, and is not easily changed, even though some frequencies may be more desirable than others. The prior art has therefore first determined the desirable frequency for the particular application at hand, and has then designed a flexure which will dither at that frequency. This approach prevents off-the-shelf stockpiling of standard flexure sizes.

SUMMARY OF THE INVENTION

It is an objective of the present invention to quickly and conveniently change the dither frequency of a ring laser gyro flexure without having to entirely replace the flexure, the gyro, or both.

It is a feature of the present invention that the tuner described herein may come in a variety of sizes and stiffnesses, and that the stiffness of the tuner is not uniquely determined by its size.

It is an advantage of the present invention that a wide variety of tuners, all of the same size but with a correspondingly wide variety of stiffnesses, may fit on the same ring laser gyro flexure, thereby providing a wide variety of dither frequencies.

DETAILED DESCRIPTION OF A PREFERRED EMBODIMENT

Figure 1:
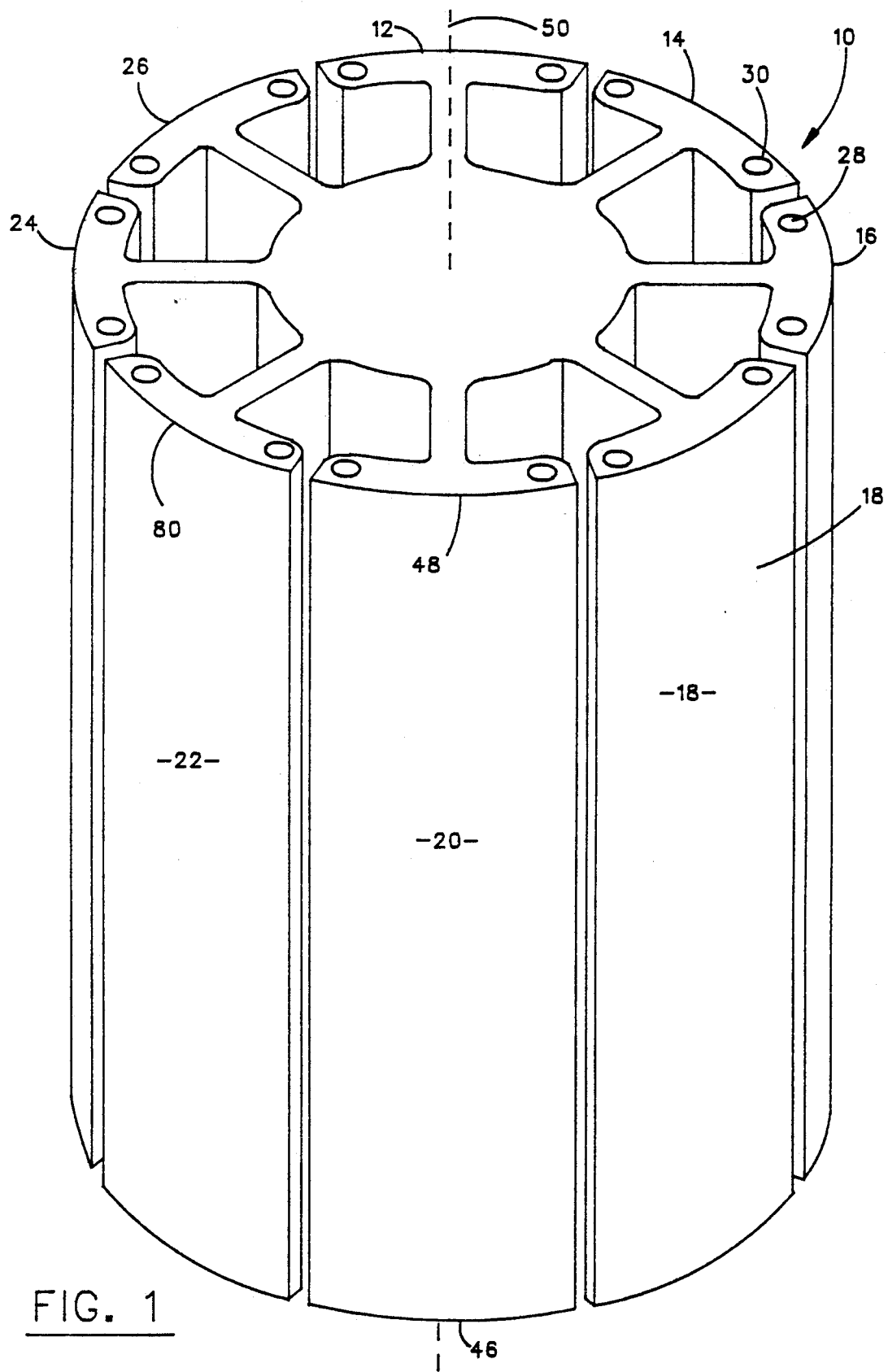
FIG. 1 is a perspective view of a ring laser gyro flexure.

A ring laser gyro flexure 10 conveniently comprises eight vanes 12-26. A greater or lesser number of vanes may be used if convenient. The "even" vanes 12, 16, 20, and 24 are mounted to a base (not shown) through bolt holes 28, and may also be called "base mounted vanes." The "odd" vanes 14, 18, 22, and 26 support the ring laser gyro (not shown) through a series of bolt holes 30, and may also be called "gyro mounting vanes." Two bolt holes per vane are preferred for additional stability, but adequate stability for some applications may be obtained with a single bolt hole per vane.

Figure 2:
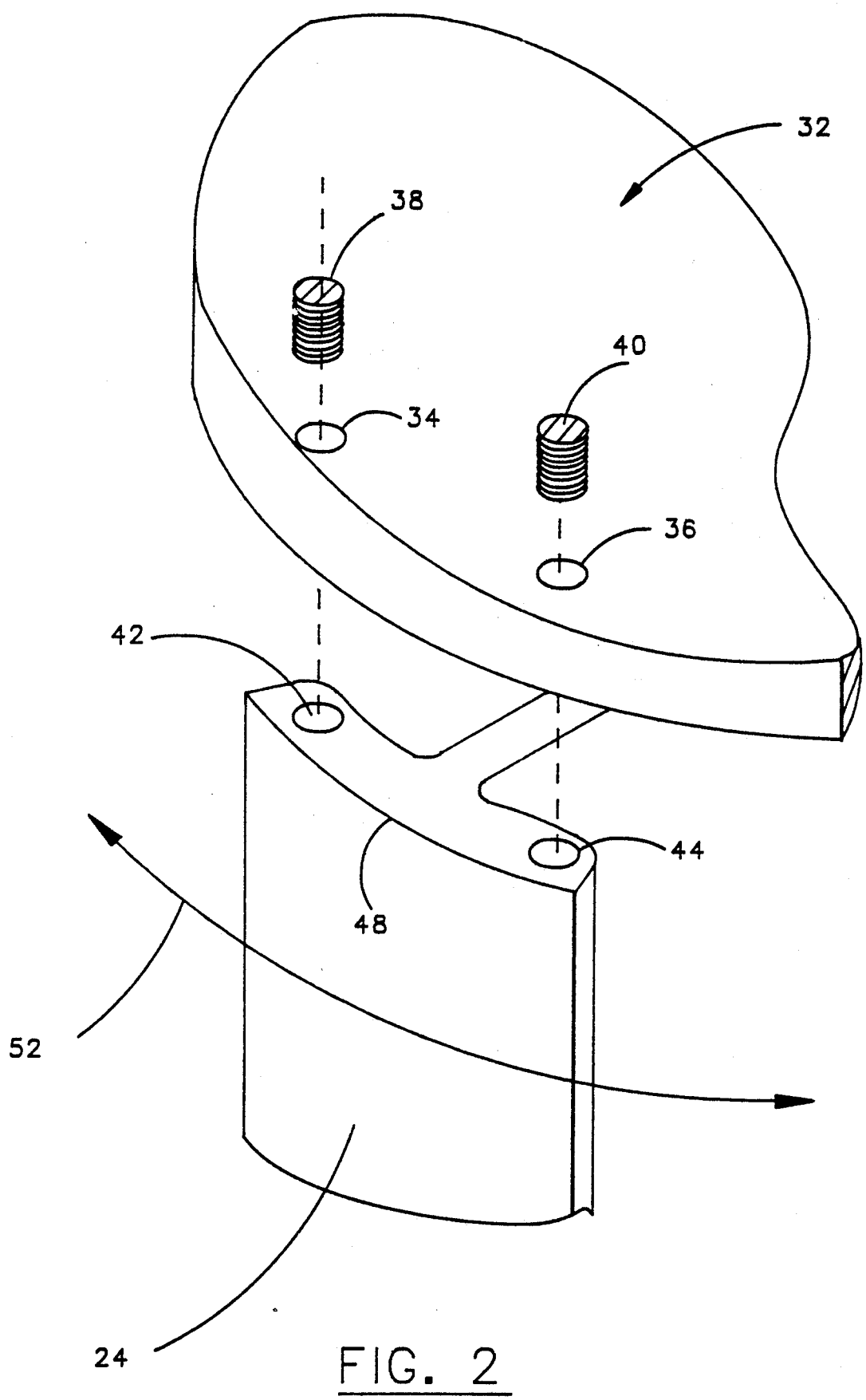
FIG. 2 is a close up perspective view of one vane of the flexure of FIG. 1, showing how a disk embodiment of the tuner of the present invention may be bolted to the vane.

FIG. 2 shows a first embodiment of the present invention, in which a disk 32 includes bolt holes 34 and 36, through which bolts 38 and 40 penetrate into bolt holes 42 and 44 of even vane 24. All even vanes 12, 16, 20, and 24 are bolted to the disk (or tuner) 32, and none of the odd vanes 14, 18. 22, or 26 are so bolted. The tuner 32 increases the stiffness of the flexure 10, and thereby increases its frequency.

While not wishing to bound, Applicant believes that this frequency shift comes about as the result of the flexibility of the even vanes 12, 16, 20, and 24. While their lower edges 46 form base mounting ends, are tightly bolted to the base (see FIG. 1), and are therefore unable to vibrate, their upper edges 48 form opposite ends and are sufficiently removed from their lower edges 46 as to vibrate azimuthally about the center axis 50 of the flexure 10. This azimuthal vibration is shown by arrow 52 in FIG. 2. Locking together the top edges 48 of the even vanes 12, 16, 20, and 24 with the tuner 32 increases the spring constant of the vibration of these top edges 48, thereby increasing the spring constant, and thus the frequency, of the flexure 10 as a whole.

Figure 3:
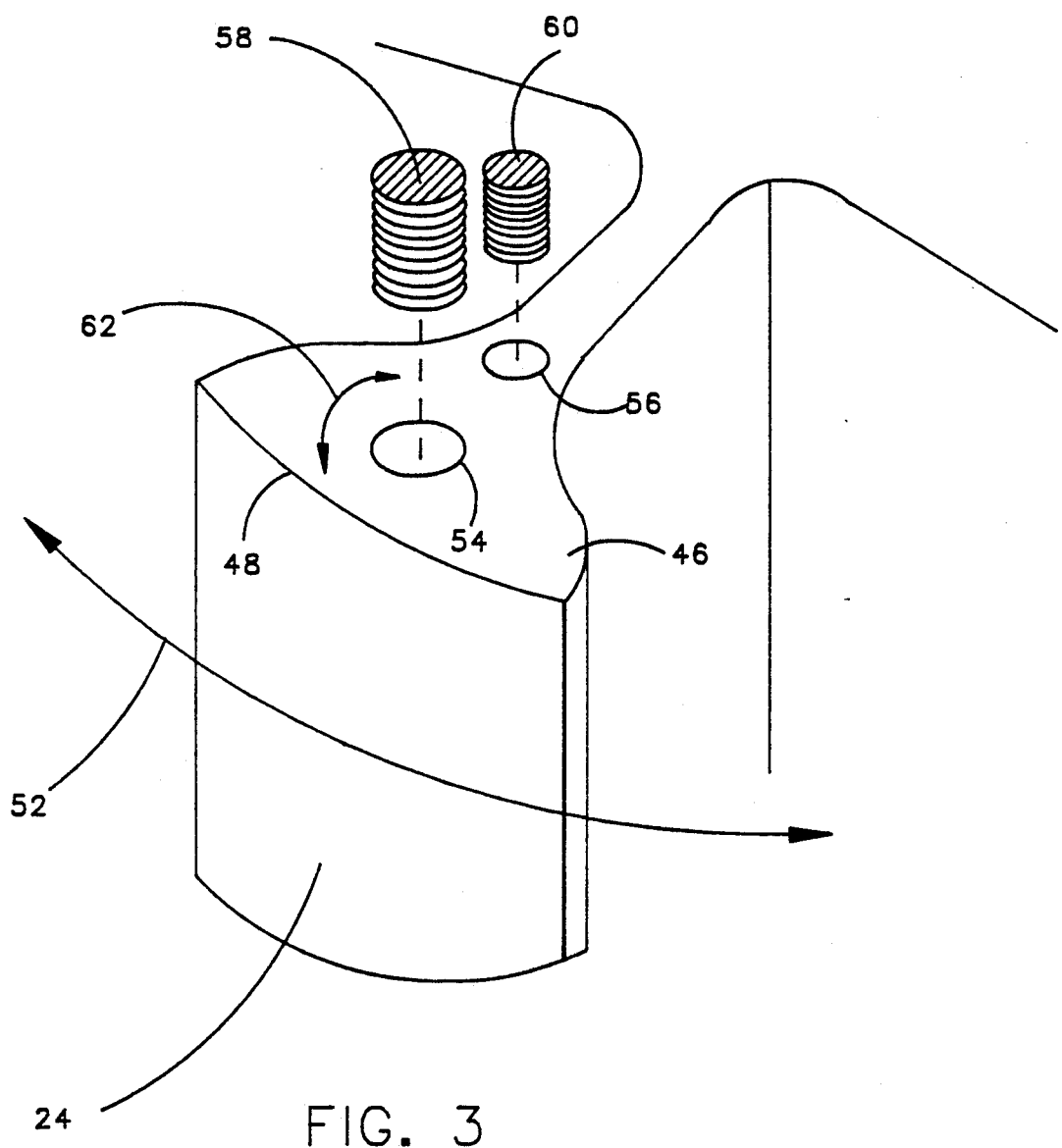
FIG. 3 is similar to FIG. 2, but shows an alternative placement of the bolt holes, providing additional stiffness.

FIG. 3 shows a means of providing additional stiffness. Whereas in FIG. 2 the bolt holes 42 and 44 were drilled azimuthally from each other, the corresponding FIG. 3 bolt holes 54 and 56, receiving bolts 58 and 60, are drilled radially from each other. Bolt 58, which is further from the central axis 50 than is bolt 60, penetrates all the way through the vane 24 and bolts the vane 24 to the base (not shown). The upper edge 48 of the vane 24 therefore not only vibrates center-azimuthally 52 about the center axis 50 of the flexure 10, but also rotates boltwise-azimuthally 62 about the axis of the bolt 58. If the tuner 32 is mounted by radially arranged bolts 58 and 60, the inner bolt 60 will greatly reduce this boltwise-azimuthal rotation 62. This is shown schematically in FIG. 4, in which bolt holes 64 and 66 in the tuner 32 are in registration with bolt holes 54 and 56 of the vane 24.

Figure 4:
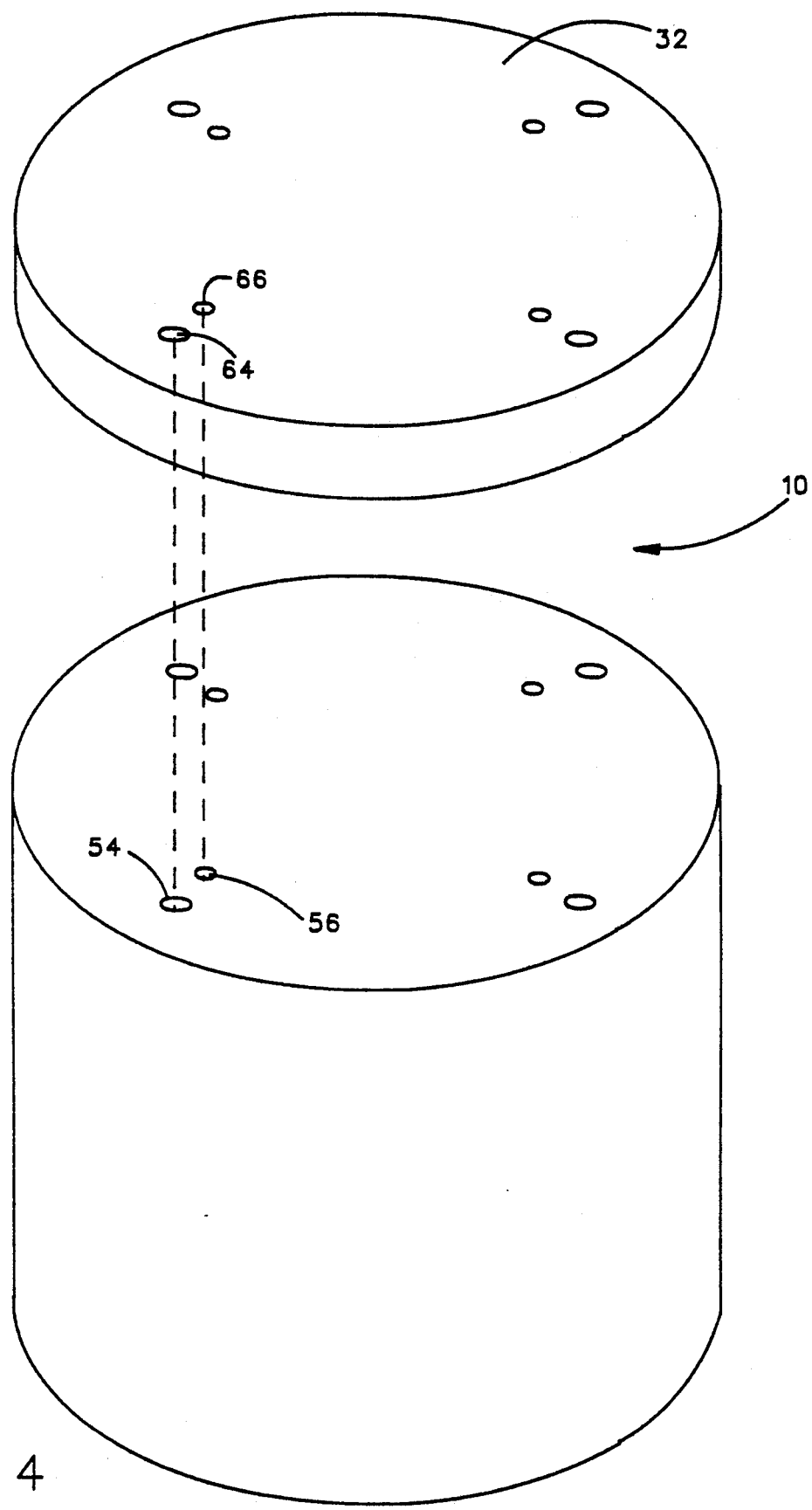
FIG. 4 is an exploded view of the disk version of the tuner, shown ready for mounting on a schematically shown ring laser gyro flexure.
Figure 5:
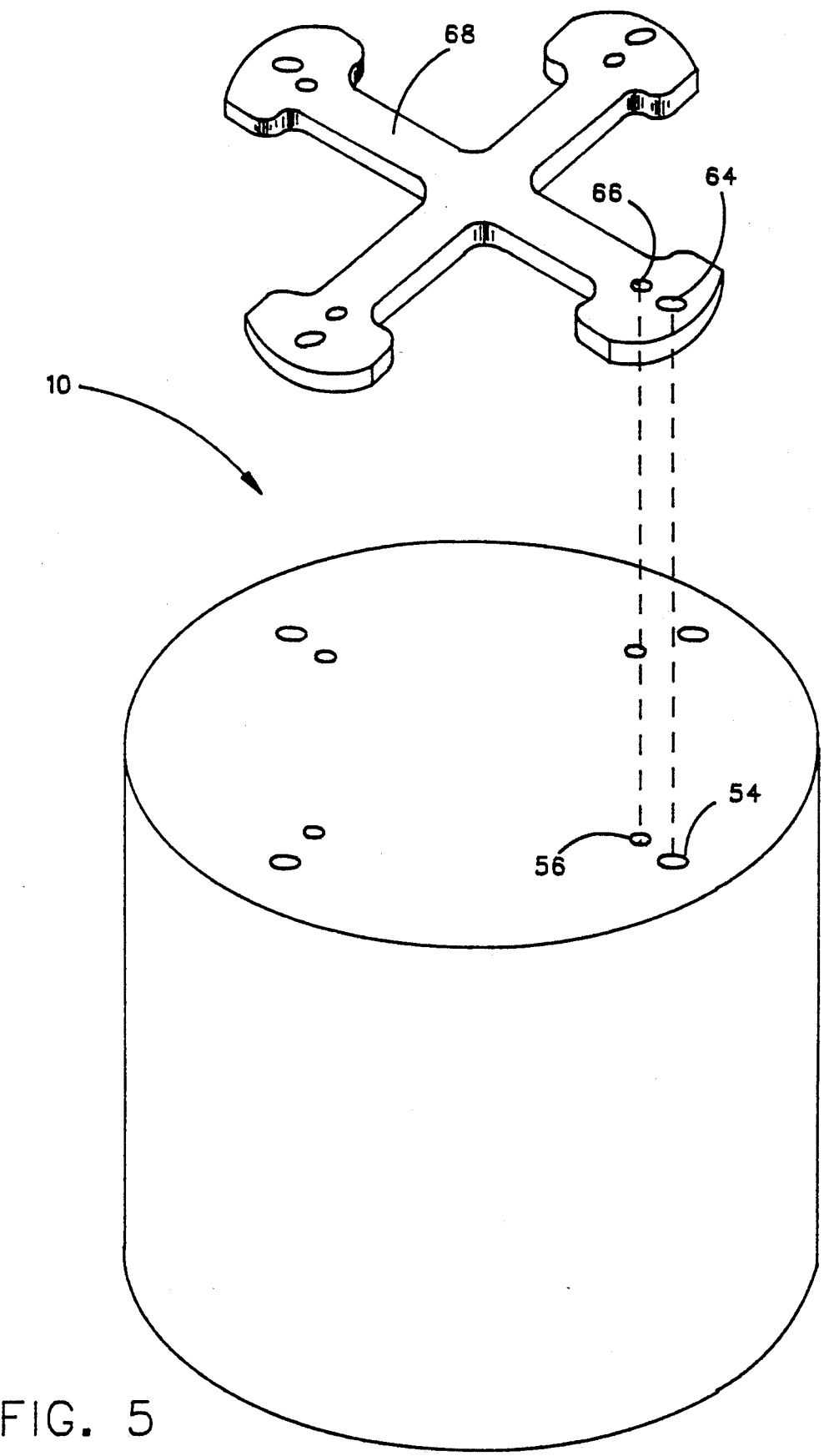
FIG. 5 is similar to FIG. 4, but shows a four arm version of the tuner rather than a disk version.

FIG. 5 shows a cruciform, or four arm, tuner 6B, rather than the disk shaped tuner 32 of FIGS. 2, 3, and 4. The arms connect only the opposite ends 48 of the base mounted vanes, and are therefore called base mounted arms. The principle of operation is the same as in FIG. 4, but the coupling between individual even vanes 12, 16, 20, and 24 is not as great, thereby reducing the spring constant of the tuner 68, thereby reducing the change in frequency of dithering.

Figure 6:
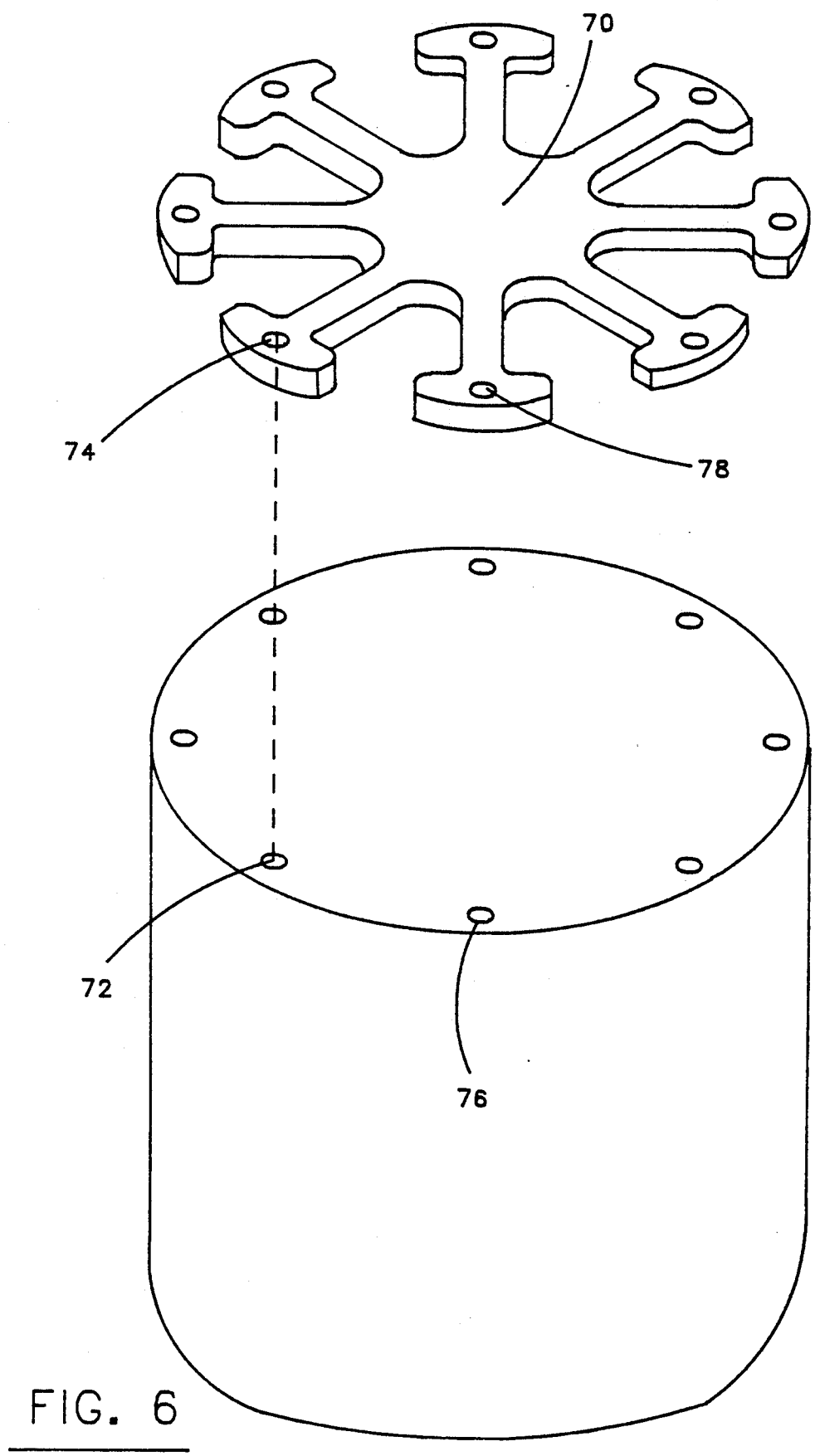
FIG. 6 is similar to FIGS. 4 and 5, but shows an eight arm version of the tuner.

FIG. 6 shows an eight arm tuner 70, in which an even bolt hole 72 of each even vane is in registration with an even bolt hole 74 of the tuner 70, while an odd bolt hole 76 of each odd vane is in registration with an odd bolt hole 78 of the tuner 70. The odd bolt hole 76 is in the opposite end 80 of the odd vane, so called because it adjoins the opposite ends 48 of the even vanes (see FIG. 1). This tuner shares with the tuner 68 of FIG. 5 the comparatively reduced coupling of the even vanes 12, 16, 20, and 24 among themselves, but adds to it the coupling of these even vanes with the odd vanes 14, 18, 22, and 26. The eight arm tuner 70 includes not only the base mounted arms of the four arm tuner 68, but also a plurality of gyro mounting arms, so called because they are affixed to the opposite ends 80 of the gyro mounting vanes. The eight arm tuner 70 generally has a stiffness greater than that of the four arm tuner 68, but less than that of the disk tuner 32.

Each of the above-described tuners adds slightly to the rotational inertia of the dithering gyro, but adds much more to the spring constant of the flexure 10. Each of these tuners, therefore, increases the frequency of rotational dither. The amount of the increase is a function of the thickness, shape, and composition of the tuner, and may be calculated by those having skill in the art. Alternatively, different tuners may be tried until the desired frequency is obtained.

Ring laser gyros generally come in groups of three, one for each of three orthogonal axes. Cross-coupling of dithering between the various gyros is generally considered undesirable. It is therefore important that each gyro dither at a different frequency. Leaving one gyro without a tuner, supplying a second gyro with a tuner of low stiffness, and supplying the third gyro with a tuner of high stiffness produces the desired frequency separation. If convenient, the high stiffness tuner may be constructed on the spot by bolting together two tuners of lower stiffness, although this is not preferred.

If any of the frequencies thus constructed is undesirably close to an interfering extrinsic frequency (such as that of the engine of the vehicle upon which the gyros are mounted), all three gyros may have their frequencies increased to avoid this undesirable frequency, yet remain desirably separated in frequency from one another. Significantly, these frequency adjustments may be conveniently made in the field by adding, removing, or changing the tuner or tuners of any or all of the ring laser gyro flexures involved. A simple wrench and a supply of spare tuners is all that is required.

INDUSTRIAL APPLICABILITY

The present invention is capable of exploitation in industry, and can be used, whenever it is desired to conveniently change the dither frequency of a ring laser gyro flexure. The present invention can be made from components and/or materials which, taken separately and apart from one another, are entirely conventional, or it may be made from their nonconventional analogs.

While particular embodiments of the present invention have been described in some detail, the true scope and spirit of the present invention are not limited thereto, but are limited only by the appended claims.

What is claimed is:

1. A tuner for a ring laser gyro flexure with a first plurality of base mounted vanes and a second plurality of gyro mounting vanes, each base mounted vane including a base mounting end and an opposite end, the turner comprising a plurality of arms, each arm being constructed to be affixed to a respective base mounted vane opposite end.

2. A tuner for a ring laser gyro flexure with a first plurality of base mounted vanes and a second plurality of gyro mounting vanes, each base mounted vane including a base mounting end and an opposite end, and each gyro mounting vane including an opposite end adjoining the opposite ends of the base mounted vanes, the tuner comprising means for affixing together the opposite ends of the base mounted vanes, and means for affixing together the opposite ends of the gyro mounting vanes.

3. The tuner of claim 2, wherein the tuner comprises:
   (a) a first plurality of base mounted arms, each arm being constructed to be affixed to the opposite end of a respective base mounted vane; and
   (b) a second plurality of gyro mounting arms, each arm being constructed to be affixed to the opposite end of a respective gyro mounting vane.

4. The tuner of claim 2, wherein the tuner comprises a disk.

5. A method for tuning a ring laser gyro flexure with a first plurality of base mounted vanes and a second plurality of gyro mounting vanes, each base mounted vane including a base mounting end and an opposite end, the method comprising:
   (a) the step of affixing together the opposite ends of the base mounted vanes; and
   (b) the steps of affixing the opposite end of each respective base mounted vane to a respective arm of a tuner.

6. A method for tuning a ring laser gyro flexure with a first plurality of base mounted vanes and a second plurality of gyro mounting vanes, each base mounted vane including a base mounting end and an opposite end, and each gyro mounting vane including an opposite end adjoining the opposite ends of the base mounting vanes;
   (b) the method comprising the step of affixing together the opposite ends of the base mounted vanes, and the step of affixing together the opposite ends of the gyro mounting vanes.

7. The method of claim 6, wherein:
   (a) the tuner comprises a first plurality of base mounted arms and a second plurality of gyro mounting arms; and
   (b) the method further comprises the steps of: (i) affixing each base mounted arm to the opposite end of a respective base mounted vane; and (ii) affixing each gyro mounting arm to the opposite end of the respective gyro mounting vane.

8. The method of claim 6, wherein the tuner comprises a disk.

* * * * *

UNITED STATES PATENT AND TRADEMARK OFFICE
CERTIFICATE OF CORRECTION

PATENT NO. : 5,187,544
DATED : February 16, 1993
INVENTOR(S) : Thomas M. Wirt

It is certified that error appears in the above-identified patent and that said Letters Patent is hereby corrected as shown below:

Claim 6 (Column 4, line 37):
    delete "(b)"

Signed and Sealed this

Twenty-eighth Day of December, 1993

Attest:

BRUCE LEHMAN

*Attesting Officer*   *Commissioner of Patents and Trademarks*